United States Patent [19]

Noi et al.

[11] Patent Number: 5,520,759

[45] Date of Patent: May 28, 1996

[54] METHOD FOR PRODUCING CERAMIC PARTS

[75] Inventors: Keiichi Noi, Kyoto; Iwao Ueno, Jyoyou; Yoichi Ogoshi, Sapporo; Yasuo Wakahata, Katano, all of Japan

[73] Assignee: Matsushita Electric Industrial Co., Ltd., Osaka, Japan

[21] Appl. No.: 211,707

[22] PCT Filed: Sep. 2, 1993

[86] PCT No.: PCT/JP93/01240

§ 371 Date: Apr. 20, 1994

§ 102(e) Date: Apr. 20, 1994

[87] PCT Pub. No.: WO94/06129

PCT Pub. Date: Mar. 17, 1994

[30] Foreign Application Priority Data

Sep. 3, 1992 [JP] Japan .................................. 4-235546

[51] Int. Cl.$^6$ ............................ B32B 31/00; H01G 5/00; H01G 4/06
[52] U.S. Cl. .................. 156/89; 264/60; 264/61; 264/65; 361/311; 361/321.2; 361/321.4; 361/321.5; 361/277
[58] Field of Search .................. 156/89; 257/4, 257/43; 338/20; 361/311, 321.5, 277, 321.2, 321.4; 264/58, 56, 60, 65, 66

[56] References Cited

U.S. PATENT DOCUMENTS

| | | | |
|---|---|---|---|
| 3,342,655 | 9/1967 | Crownover | 156/89 |
| 4,046,847 | 9/1977 | Kresge | 257/43 X |
| 4,082,906 | 4/1978 | Amin et al. | 156/89 X |
| 4,296,002 | 10/1981 | Sokoly et al. | 338/20 X |
| 4,325,763 | 4/1982 | Utsumi et al. | 361/321.5 X |
| 4,551,269 | 11/1985 | Hennings et al. | 338/20 X |
| 4,571,276 | 2/1986 | Akse | 156/89 |
| 4,607,316 | 8/1986 | Wada et al. | 264/65 X |
| 5,119,062 | 6/1992 | Nakamura et al. | 338/20 |
| 5,268,006 | 12/1993 | Ueno et al. | |

FOREIGN PATENT DOCUMENTS

| | | |
|---|---|---|
| 60-250602 | 12/1985 | Japan . |
| 1-289204 | 11/1989 | Japan . |
| 2-213101 | 8/1990 | Japan . |
| 311716 | 1/1991 | Japan . |
| 9010941 | 9/1990 | WIPO . |

Primary Examiner—David A. Simmons
Assistant Examiner—M. Curtis Mayes
Attorney, Agent, or Firm—Watson Cole Stevens Davis

[57] ABSTRACT

The present invention relates to a method for manufacture of ceramic parts used for protecting semiconductor devices such as IC, LSI, etc. against anomalous high voltages such as noise, pulse, static electricity, etc. and the object of the present invention is to provide ceramic parts capable of removing or restraining high-frequency noises on signal lines by reducing the impedance of the devices.

In order to attain the above object, according to the present invention, a pulse voltage of 50 kV in maximum value which requires a time of 200 nanoseconds or less for reaching the maximum value from an initial value and a time of 1 microsecond or less for returning to the initial value through the maximum value and which has an energy of 0.5 joule or lower is applied at least once between the electrodes (2).

11 Claims, 2 Drawing Sheets

METHOD FOR PRODUCING CERAMIC PARTS

TECHNICAL FIELD

The present invention relates to a method for producing ceramic parts used for protecting semiconductor devices such as IC and LSI used in electronic equipments and electric equipments against high-frequency noises and anomalous high voltages such as noise, pulse and static electricity.

BACKGROUND ART

Recently, semiconductor devices such as IC and LSI have been widely used in electronic equipments or electric equipments for miniaturization of the devices and for giving multifunctions to the devices. However, the use of the semiconductor devices causes decrease in resistance of the electronic equipments and electric equipments against anomalous high voltage such as noise, pulse or static electricity.

In order to ensure the resistance of electronic equipments and electric equipments against anomalous high voltage such as noise, pulse or static electricity, film capacitors, electrolytic capacitors, semiconductor ceramic capacitors, laminated ceramic capacitors are used. These have excellent characteristics for absorption and control of noises of relatively low voltage or high-frequency noises, but they exhibit no effect on pulses or static electricity of high voltage and sometimes cause wrong operation or rupture of semiconductor devices.

In order to absorb and control pulses or static electricity of high voltage, SiC and ZnO type varistors are used. However, these have no effect for absorption and control of noises of relatively low voltage and high-frequency noises and are apt to bring about wrong operation.

Under the circumstances, $SrTiO_3$ type varistors have been developed to be effective against noises of relatively low voltage or high-frequency noises and pulses or static electricity of high voltage.

However, owing to the high impedance of elements, the $SrTiO_3$ type varistors also have the problems that they are low in the effects to absorb and control pulses of relatively low voltage or high-frequency noises applied to signal lines.

The inventors have noticed that the high impedance is caused by a barrier formed at electrode part. Accordingly, the object of the present invention is to attain the high effects to absorb and control pulses of relatively low voltage and high-frequency noises applied to signal lines by reducing the impedance by destroying the barrier formed at the electrode part.

DISCLOSURE OF THE INVENTION

In order to attain the above object, the present invention provides a method for manufacturing a ceramic part according to which a pulse voltage having a maximum value of 50 kV and an energy of 0.5 joule or lower and requiring a time of 200 nanoseconds or less for reaching the maximum value from an initial value and a time of 1 microsecond or less for returning to the initial value through the maximum value is applied once or more times between electrodes.

According to the above method, the following effects are obtained. That is, when an electrode layer is formed on a ceramic element comprising a composition mainly composed of, for example, $SrTiO_3$ and fired in a reducing atmosphere and then the ceramic layer and the electrode layer are simultaneously fired in a neutral or oxidizing atmosphere, the surface of the electrode layer is oxidized to produce a portion of high resistance and a barrier is formed on the surface and inside of the electrode layer to cause increase in impedance of the element and increase in tan $\delta$ together with decrease in electric capacity and as a result, the effects to absorb and control noises are damaged. This barrier is generated by oxidation of the surface and inside of the electrode and since the height of the barrier is relatively low, the barrier can be removed by application of a relatively small energy such as electric energy without causing variation in varistor voltage or deterioration of the non-linear coefficient of the voltage of parts having other characteristics such as varistor characteristics.

As shown in the present invention, by applying as an electric energy a steep wave pulse voltage which is short in time required for reaching the maximum value and in time required for returning to the initial value, the energy is concentrated into the portion weakest in the barrier formed at the interface of the electrode layer and breaks through a part of the barrier whereby resistance of the barrier can be reduced. When the electric energy applied is too large, the barrier formed at grain boundary of the ceramic layer is damaged and functions possessed by the parts, especially capacitor function is deteriorated. Accordingly, by applying a steep wave pulse voltage of relatively small energy, only the barrier formed at the interface of the electrode layer can be removed and the impedance inherently possessed by the parts can be taken out without causing deterioration of capacitor characteristics of the parts and without giving influence to the varistor characteristics. Thus, noise attenuation factor can be increased with decrease in impedance and the high frequency noise entering into signal lines can be absorbed and controlled.

BEST MODE FOR CARRYING OUT THE INVENTION

The present invention will be illustrated by the following examples.

EXAMPLE 1

Figure 2:
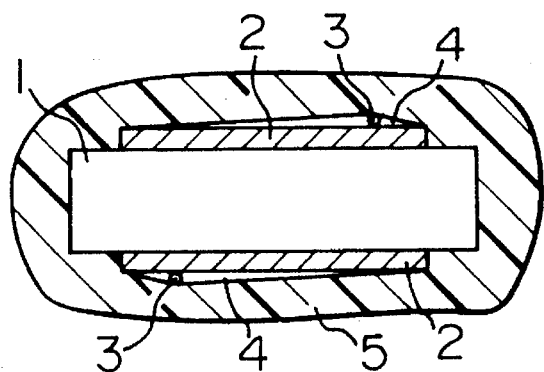
FIG. 2 is a cross-sectional view of the ceramic part produced in Example 1.

99.2 mol % of $SrCO_3$, $CaCO_3$ and $TiO_2$ so as to obtain the compositional ratio $(Sr_{0.98}Ca_{0.02})_{0.995}TiO_3$ as a first component, 0.3 mol % of $Nb_2O_5$ as a second component, 0.2 mol % of $MnCO_3$ and 0.1 mol % of $Cr_2O_3$ as a third component and 0.2 mol % of $SiO_2$ as a fourth component were weighed, mixed and ground in a ball mill for 20 Hr, calcined at 800° C. for 2 Hr in dry air, and ground again for 20 Hr in a ball mill to obtain a powder of 2.0 μm or smaller in average particle size. To the thus obtained powder was added 10 wt % of an organic binder such as polyvinyl alcohol and the powder was granulated. A disc-like ceramic element 1 of 10 mm in diameter×1 mm thick as shown in FIG. 2 was prepared therefrom.

Thereafter, this ceramic element 1 was calcined at 1000° C. for 1 Hr. Then, an electrode paste comprising Pd or the like was coated on the front and back sides of this ceramic element 1 by screen printing or the like and dried at 120° C. The coated ceramic element was fired, for example, at 1410° C. for 5 Hr in a reducing atmosphere of $N_2:H_2=9:1$ and then, reoxidized at 1080° C. for 2 Hr in the air to form electrodes 2 on the front and back sides of the ceramic element 1. Then, lead wire 3 was attached onto the respective electrodes 2 by an electroconductive adhesive 4 such as a solder and these were externally coated with resin 5 such as epoxy resin. A steep wave pulse as shown in Table 1 was applied between the both electrodes 2 of the resulting ceramic part through lead wire 3. Changes in characteristics before and after application of the pulse are also shown in Table 1.

Figure 1:
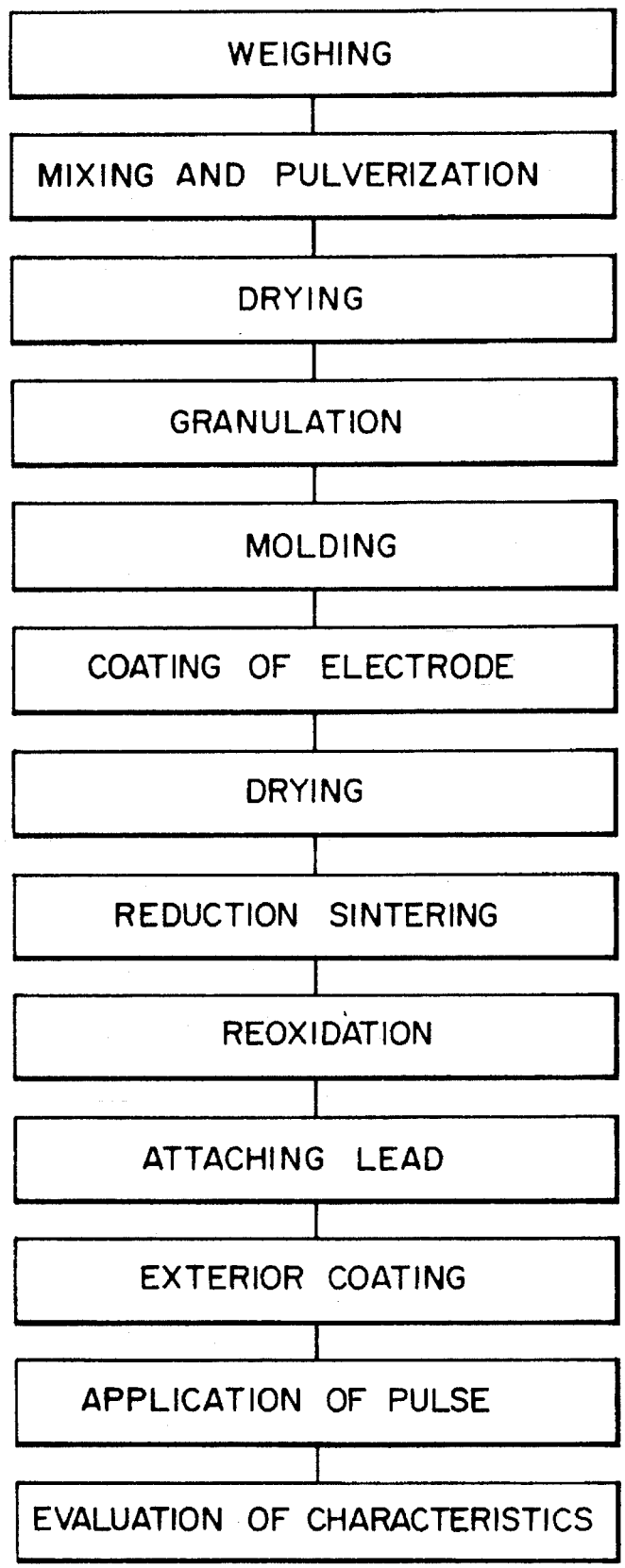
FIG. 1 is a flow chart which shows the production steps in Example 1 of the present invention.

The steps are shown in FIG. 1.

comprising Pd or the like was printed on said layer by screen printing or the like and dried. Thereon were further stacked a given number of the green sheets 6 and then, the inner electrode comprising Pd or the like was again printed by screen printing or the like and dried. In this case, the inner electrodes 7 were printed so that they are distributed alternatively one by one to the opposite (different) directions in the laminates. In this way, a given number of the green sheets 6 and a given number of the inner electrodes 7 were stacked and finally, a given number of the green sheets 6 were stacked to form an uppermost unavailable layer. These were pressed and bonded under heating to laminate them. The laminate was cut to a given shape to form a laminate 8 shown in FIG. 3.

Then, this laminate 8 was calcined and degreased at 800° C. for 40 Hr in the air, then fired at 1310° C. for 5 Hr in a

TABLE 1

| No. | Steepness of wave crest (nsec) | Wave tail (μsec) | Peak voltage (kV) | Energy (J) | The number of application of pulse | ΔC (%) | $\Delta V_{0.1mA}$ (%) | Δα (%) | After application of pulse tanδ (%) | ESR (mΩ) |
|---|---|---|---|---|---|---|---|---|---|---|
| 1* | — | — | — | — | — | — | — | — | 10.0 | 2000 |
| 2 | 2 | 0.1 | 20 | 0.10 | 10 | +7.2 | −0.3 | −0.1 | 3.2 | 75 |
| 3 | 10 | 0.1 | 20 | 0.10 | 10 | +6.3 | −0.3 | −0.1 | 4.2 | 105 |
| 4 | 80 | 0.1 | 20 | 0.11 | 10 | +5.5 | −0.3 | −0.1 | 4.5 | 110 |
| 5 | 170 | 0.1 | 20 | 0.11 | 10 | +2.8 | −0.4 | −0.1 | 4.9 | 112 |
| 6** | 250 | 0.1 | 20 | 0.12 | 10 | +1.4 | −0.4 | −0.1 | 8.8 | 280 |
| 7 | 5 | 0.5 | 25 | 0.15 | 1 | +7.9 | −0.3 | −0.1 | 3.0 | 65 |
| 8 | 5 | 0.8 | 25 | 0.16 | 1 | +8.2 | −0.3 | −0.1 | 2.8 | 60 |
| 9** | 5 | 1.5 | 25 | 0.17 | 1 | +9.7 | −0.9 | +0.2 | 8.5 | 1200 |
| 10 | 5 | 0.1 | 5 | 0.01 | 5 | +7.2 | −0.2 | −0.1 | 3.4 | 177 |
| 11 | 5 | 0.1 | 10 | 0.02 | 5 | +7.9 | −0.2 | −0.1 | 3.0 | 110 |
| 12 | 5 | 0.1 | 30 | 0.22 | 5 | +8.6 | −0.3 | −0.1 | 2.8 | 70 |
| 13 | 5 | 0.1 | 40 | 0.40 | 5 | +9.5 | −2.5 | +0.2 | 3.5 | 42 |
| 14** | 3 | 0.1 | 55 | 0.45 | 5 | +15.9 | −7.4 | +11.0 | 18.9 | 55 |
| 15 | 2 | 0.1 | 25 | 0.20 | 10 | +7.5 | −0.2 | −0.1 | 3.7 | 60 |
| 16 | 2 | 0.1 | 25 | 0.40 | 10 | +7.9 | −0.5 | −0.1 | 3.5 | 57 |
| 17** | 2 | 0.1 | 25 | 0.76 | 10 | +28.4 | +15.3 | +15.8 | 26.4 | 1750 |
| 18 | 2 | 0.1 | 25 | 0.15 | 100 | +7.2 | −0.1 | −0.1 | 4.2 | 70 |
| 19 | 2 | 0.1 | 25 | 0.15 | 1000 | +7.2 | −0.1 | −0.1 | 4.2 | 70 |
| 20 | 2 | 0.1 | 25 | 0.15 | 10000 | +7.2 | −0.1 | −0.1 | 4.2 | 68 |
| 21 | 2 | 0. | 25 | 0.15 | 50000 | +7.3 | −0.1 | −0.1 | 4.2 | 72 |

(1) The mark * shows application of no pulse.
(2) The mark ** shows comparative examples.
(3) The steepness of wave crest means a time required for the pulse reaching the maximum value from the initial value.
(4) The wave tail means a time required for the pulse returning to the initial value through the maximum value.
(5) The peak voltage means the maximum value of the pulse.
(6) The energy means the energy of one pulse.
(7) ΔC shows the rate of change in electric capacity before and after application of the pulse.
(8) $\Delta V_{0.1mA}$ shows the rate of change in varistor voltage before and after application of the pulse.
(9) Δα shows the rate of change in non-linear index before and after application of the pulse.
(10) ESR means equivalent serial resistance in resonance frequency.

EXAMPLE 2

Figure 3:
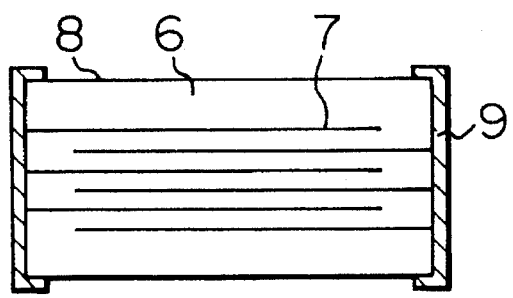
FIG. 3 is a cross-sectional view of the ceramic part produced in Example 2.

99.2 mol % of $SrCO_3$, $CaCO_3$ and $TiO_2$ so as to obtain the compositional ratio $(Sr_{0.85}Ca_{0.15})_{0.985}TiO_3$ as a first component, 0.3 mol % of $Nb_2O_5$ as a second component, 0.2 mol % of $MnCO_3$ and 0.1 mol % of $Cr_2O_3$ as a third component and 0.2 mol % of $SiO_2$ as a fourth component were weighed, mixed and ground in a ball mill for 20 Hr, calcined at 800° C. for 4 Hr in dry air, and again mixed and ground for 80 Hr in a ball mill to obtain a powder of 1.0 μm or smaller in average particle size. The thus obtained powder was mixed with an organic binder such as butyral resin and an organic solvent to prepare a slurry. The slurry was molded by a sheet-molding method such as doctor blade method to obtain a green sheet 6 having a thickness of about 50 μm as shown in FIG. 3.

A given number of the green sheets 6 were stacked to form an undermost unavailable layer. An inner electrode 7 reducing atmosphere of, for example, $N_2:H_2=9:1$, and thereafter reoxidized at 980° C. for 2 Hr in the air. Thereafter, an electrode paste comprising Ag or the like was coated on the edge faces of the inner electrodes 7 exposed at the different edges and fired at 700° C. for 10 minutes in the air to form outer electrodes 9. A steep wave pulse as shown in Table 2 was applied between the outer electrodes 9 of the thus obtained ceramic part. Changes in characteristics before and after application of the pulse are also shown in Table 2.

TABLE 2

| No. | Steepness of wave crest (nsec) | Wave tail (μsec) | Peak voltage (kV) | Energy (J) | Before application of pusle $V_{0.1mA}$ (V) $\bar{X}$ | σ | After application of pulse $V_{0.1mA}$ (V) $\bar{X}$ | σ | ΔC (%) | tanδ (%) | ESR (mΩ) |
|---|---|---|---|---|---|---|---|---|---|---|---|
| 1* | — | — | — | — | 12.5 | 2.25 | — | — | — | 25.8 | 1850 |
| 2 | 5 | 0.1 | 25 | 0.20 | 6.0 | 2.45 | 6.0 | 2.46 | +7.5 | 10.1 | 90 |
| 3 | 5 | 0.1 | 25 | 0.20 | 8.2 | 1.88 | 8.2 | 1.87 | +7.9 | 8.5 | 75 |
| 4 | 3 | 0.1 | 25 | 0.20 | 9.5 | 1.71 | 9.5 | 1.71 | +6.3 | 7.6 | 70 |
| 5 | 3 | 0.1 | 25 | 0.20 | 10.7 | 1.86 | 10.7 | 1.85 | +6.5 | 6.8 | 68 |
| 6 | 3 | 0.1 | 25 | 0.20 | 12.3 | 1.82 | 12.3 | 1.83 | +7.0 | 6.5 | 55 |
| 7 | 2 | 0.1 | 30 | 0.20 | 14.8 | 2.12 | 14.7 | 2.13 | +7.4 | 5.0 | 50 |
| 8 | 2 | 0.1 | 30 | 0.20 | 16.2 | 2.34 | 16.1 | 2.35 | +7.6 | 4.8 | 72 |
| 9 | 2 | 0.1 | 30 | 0.20 | 20.7 | 3.21 | 20.6 | 3.28 | +7.8 | 4.3 | 85 |

The mark * shows application of no pulse.
The pulse was applied ten times.

EXAMPLE 3

Figure 4:
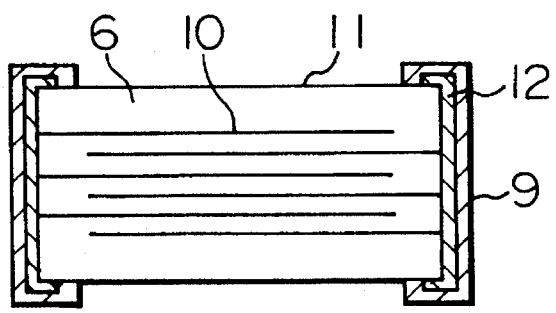
FIG. 4 is a cross-sectional view of the ceramic part produced in Example 3.

Green sheet 6 was obtained in the same manner as in Example 2. A given number of the green sheets 6 were stacked to form an unavailable layer of an undermost layer. An inner electrode 10 comprising NiO or the like was printed thereon by screen printing or the like and dried. Thereon were further stacked a given number of the green sheets 6 and an inner electrode 10 comprising NiO or the like was again printed by screen printing or the like and dried. In this case, the inner electrodes 7 were printed so that they are distributed alternatively one by one to the opposite (different) directions in the laminates. In this way, a given number of the green sheets 6 and a given number of the inner electrodes 10 were stacked and finally an uppermost unavailable layer was formed by stacking a given number of the green sheets 6. These were pressed and bonded under heating to laminate them. Then, the laminate was cut to a given shape to form a laminate 11 shown in FIG. 4.

Then, the laminate 11 was calcined and degreased at 900° C. for 20 Hr in the air. Thereafter, an electrode paste comprising NiO or the like was coated on edge faces of the inner electrodes 10 exposed at the different edges and fired at 1210° C. for 10 Hr in a reducing atmosphere of, for example, $N_2:H_2=9:1$ to simultaneously carry out reduction of the laminate 11 and reduction of the outer electrode 12 comprising NiO or the like.

Thereafter, an electrode paste comprising Ag or the like was coated on the surface of the outer electrode 12 and reoxidized at 900° C. for 3 Hr in the air to form an outer electrode 9. Then, onto the outer electrode 9 are applied Ni plating, for example, by electrolytic process and then solder plating (not shown). A steep wave pulse as shown in Table 3 is applied between the outer electrodes 9 of the thus obtained ceramic part. Changes in characteristics before and after application of the pulse are also shown in Table 3.

TABLE 3

| No. | Steepness of wave crest (nsec) | Wave tail (μsec) | Peak voltage (kV) | Energy (J) | Before application of pusle $V_{0.1mA}$ (V) $\bar{X}$ | σ | After application of pulse $V_{0.1mA}$ (V) $\bar{X}$ | σ | ΔC (%) | tanδ (%) | ESR (mΩ) |
|---|---|---|---|---|---|---|---|---|---|---|---|
| 1* | — | — | — | — | 12.5 | 2.19 | — | — | — | 28.9 | 6500 |
| 2 | 2 | 0.1 | 25 | 0.20 | 5.5 | 2.52 | 5.5 | 2.53 | +6.5 | 12.3 | 50 |
| 3 | 2 | 0.1 | 25 | 0.20 | 7.4 | 1.93 | 7.4 | 1.93 | +7.2 | 10.1 | 55 |
| 4 | 3 | 0.2 | 25 | 0.20 | 9.5 | 1.84 | 9.5 | 1.83 | +7.0 | 10.2 | 54 |
| 5 | 3 | 0.2 | 25 | 0.20 | 11.0 | 1.76 | 11.0 | 1.75 | +6.4 | 9.9 | 52 |
| 6 | 5 | 0.2 | 25 | 0.20 | 13.6 | 1.80 | 13.5 | 1.80 | +6.2 | 9.2 | 60 |
| 7 | 5 | 0.2 | 25 | 0.20 | 18.9 | 2.14 | 18.8 | 2.16 | +6.0 | 8.6 | 75 |
| 8** | 2 | 0.1 | 25 | 0.45 | 25.4 | 2.36 | 21.7 | 2.52 | +30.4 | 35.2 | 1980 |

The mark * shows application of no pulse.
The mark ** shows a comparative example.
The pulse was applied ten times.

In the above Examples 1–3, the compositions of the ceramic powder shown are only a part of the combinations of some components with the main component having the basic composition of $SrTiO_3$ shown by $ABO_3$ where a part of Sr is replaced with at least one element of Ba, Ca and Mg. However, any compositions may be used as far as they contain $SrTiO_3$ as a main component and have both the functions of a capacitor and a varistor. Furthermore, in this case, the ratio A/B is $0.95 \leq (A/B) \leq 1.05$. This is because if the ratio is less than 0.95 a second phase mainly composed of Ti is formed and varistor characteristics are deteriorated and if it is more than 1.05 the dielectric constant decreases and the capacitor characteristics are deteriorated. Moreover, the ceramic powder may be ZnO or $TiO_2$. The electrode 2, the inner electrodes 7, 10, and the outer electrodes 9, 12 may be formed of at least one of Au, Pt, Rh, Pd, Ni, Cr, Zn and Cu or alloys thereof. The unavailable layer and the available layer in FIGS. 3 and 4 were formed by stacking thin green sheets 6, but may comprise one thick green sheet. As can be seen from Table 1, Table 2 and Table 3, the capacitor characteristics such as electric capacity, tan δ and ESR changed greatly by the application of pulse while the varistor characteristics showed substantially no change in both the absolute value and the standard deviation. Furthermore, in the present invention the wave of the steep pulse applied is specified so that the time required to reach the maximum voltage is 200 nanoseconds or less because the higher rising steepness (steepness of crest) of pulse voltage is effective to break the oxidized layer on the surface and inside of the electrode and when the steepness exceeds 200 nanoseconds the effect considerably decreases. Moreover, the time required for returning to the initial value (wave tail) is specified to be 1 microsecond or less because the longer wave tail is prone to affect the characteristics, especially the capacitor characteristics and when the wave tail exceeds 1 microsecond, the electric capacity sharply decreases.

The maximum value of the voltage to be applied is specified to be 50 kV or lower because with increase of the voltage applied the deterioration of the barrier formed at grain boundary of the ceramic element becomes serious and when the applied voltage exceeds 50 kV, both the capacitor characteristics and varistor characteristics are deteriorated. Moreover, the energy of pulse applied is specified to be 0.5 joule or less because when it exceeds 0.5 joule, the device generates much heat to cause deterioration of both the capacitor characteristics and varistor characteristics. The preferable conditions for application of the pulse are as follows: the time required for reaching the maximum voltage: 50 nanoseconds or less; the time required for returning to the initial voltage: 500 nanoseconds or less; the voltage applied: 3–25 kV; and the energy: 0.3 joule or less.

INDUSTRIAL APPLICABILITY

As explained above, according to the present invention, a steep wave pulse which is short in the time required for reaching the maximum voltage and the time required for returning to the initial voltage is applied to a ceramic part whereby the energy can be concentrated onto the portion of the weakest barrier produced by the oxidized layer formed on the surface and inside of the electrode thereby to break through a part of the barrier and reduce the resistance of the barrier. Accordingly, only the barrier formed at the interface of electrodes can be locally broken and impedance of the ceramic part can be reduced without causing deterioration of the capacitor characteristics of the ceramic part and without affecting the varistor characteristics.

Furthermore, as the impedance decreases the attenuation rate of noise can be increased and high frequency noise intruding into signal lines can be effectively absorbed and restrained.

We claim:

1. A method for manufacturing a ceramic part, which comprises the first step of forming a ceramic element of a given shape from a semiconductor ceramic material, the second step of forming at least two electrodes on the surface of said ceramic element, the third step of firing the ceramic element having the electrodes, and the fourth step of applying at least once between the electrodes of the fired ceramic element a steep wave pulse voltage of 50 kV or less in maximum value which requires a time of 80 nanoseconds or less for reaching the maximum value from an initial value and a time of 1 microsecond or less for returning to the initial value through the maximum value and which has an energy of 0.5 joule or lower, thereby breaking through part of a barrier occurring from an oxide layer formed on the surface and inside of the electrodes.

2. A method according to claim 1 wherein the ceramic material contains as a main component one of $SrTiO_3$, $CaTiO_3$, $BaTiO_3$, $ZnO$, $TiO_2$ and $MgTiO_3$.

3. A method according to claim 2 wherein the electrodes contain at least one of Au, Pt, Rh, Pd, Ni, Cr, Zn and Cu.

4. A method according to claim 3 wherein the ceramic element after subjected to the first step is calcined in a neutral or oxidizing atmosphere and in the third step the ceramic element having the electrodes is fired in a reducing atmosphere and then fired again in a neutral or oxidizing atmosphere.

5. A method for manufacturing a ceramic part which comprises the first step of forming a sheet from a mixture of a semiconductor ceramic material, an organic binder and a solvent, the second step of stacking a plurality of the sheets to form a laminate having a plurality of inner electrodes between the stacked sheets, the third step of forming on the outer surface of the laminate at least two outer electrodes electrically connected to the different inner electrodes, the fourth step of firing the laminate having the outer electrodes, and the fifth step of applying at least once between the outer electrodes of the fired ceramic laminate a steep wave pulse voltage of 50 kV or less in maximum value which requires a time of 80 nanoseconds or less for reaching the maximum value from an initial value and a time of 1 microsecond or less for returning to the initial value through the maximum value and which has an energy of 0.5 joule or lower, thereby breaking through part of a barrier occurring from an oxide layer formed on the surface and inside of the electrodes.

6. A method according to claim 5 wherein the ceramic material contains as a main component one of $SrTiO_3$, $CaTiO_3$, $BaTiO_3$, $ZnO$, $TiO_2$ and $MgTiO_3$.

7. A method according to claim 6 wherein the electrodes contain at least one of Au, Pt, Rh, Pd, Ni, Cr, Zn and Cu.

8. A method according to claim 7 wherein the laminated after subjected to the first step is calcined in a neutral or oxidizing atmosphere and in the fourth step the ceramic element having the electrodes is fired in a reducing atmosphere and then fired again in a neutral or oxidizing atmosphere.

9. A method for manufacturing a ceramic part, which comprises the first step of forming a sheet from a mixture of a semiconductor ceramic material, an organic binder and a solvent, the second step of stacking a plurality of the sheets to form a laminate having a plurality of inner electrodes between the stacked sheets, the third step of forming on the outer surface of the laminate at least two outer electrodes electrically connected to the different inner electrodes as a first layer, the fourth step of firing the laminate having the outer electrodes as a first layer in a reducing atmosphere, the fifth step of forming an outer electrode as a second layer on the outer electrode formed as the first layer and then firing the laminate having the first and second outer electrodes in a neutral or oxidizing atmosphere, and the sixth step of applying at least once between the second outer electrodes after fired in the neutral or oxidizing atmosphere a steep wave pulse voltage of 50 kV or less in maximum value which requires a time of 80 nanoseconds or less for reaching the maximum value from an initial value and a time of 1 microsecond or less for returning to the initial value through the maximum value and which has an energy of 0.5 joule or lower, thereby breaking through part of a barrier occurring from an oxide layer formed on the surface and inside of the electrodes.

10. A method according to claim 9 wherein the ceramic material contains as a main component one of $SrTiO_3$, $CaTiO_3$, $BaTiO_3$, $ZnO$, $TiO_2$ and $MgTiO_3$.

11. A method according to claim 10 wherein the inner electrodes contain at least one of Au, Pt, Rh, Pd, Ni, Cr, Zn and Cu.

* * * * *